United States Patent
Kon et al.

(10) Patent No.: US 9,964,766 B2
(45) Date of Patent: May 8, 2018

(54) CONTROLLING REPRODUCTION OF CONTENT IN A HEAD-MOUNTED DISPLAY

(71) Applicant: SONY CORPORATION, Tokyo (JP)

(72) Inventors: Takayasu Kon, Tokyo (JP); Kenta Kawamoto, Tokyo (JP); Yuki Yamamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/911,331

(22) PCT Filed: Nov. 11, 2014

(86) PCT No.: PCT/JP2014/005651
§ 371 (c)(1),
(2) Date: Feb. 10, 2016

(87) PCT Pub. No.: WO2015/092968
PCT Pub. Date: Jun. 25, 2015

(65) Prior Publication Data
US 2016/0282618 A1    Sep. 29, 2016

(30) Foreign Application Priority Data
Dec. 19, 2013  (JP) ................................. 2013-262926

(51) Int. Cl.
*G02B 27/01*  (2006.01)
*G06T 19/00*  (2011.01)
(Continued)

(52) U.S. Cl.
CPC ............ *G02B 27/017* (2013.01); *G06F 3/011* (2013.01); *G06T 19/006* (2013.01);
(Continued)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| 5,900,849 A | 5/1999 | Gallery | |
| 2006/0009702 A1* | 1/2006 | Iwaki | A61B 5/00 600/520 |

(Continued)

FOREIGN PATENT DOCUMENTS

| EP | 2 60 643 A2 | 5/2013 |
| JP | 06-078248 | 3/1994 |

(Continued)

OTHER PUBLICATIONS

Office Action for JP Patent Application No. 2013-262926, dated Aug. 8, 2016, 05 pages of Office Action.

*Primary Examiner* — Todd Buttram
(74) *Attorney, Agent, or Firm* — Chip Law Group

(57) ABSTRACT

An apparatus may include circuitry configured to control reproduction, at a head-mounted display device, of content, based on a determination of importance of an event occurring around the head-mounted display device.

17 Claims, 9 Drawing Sheets

(51) Int. Cl.
*G06F 3/01* (2006.01)
*H04N 13/04* (2006.01)
*H04N 13/02* (2006.01)

(52) U.S. Cl.
CPC ..... *H04N 13/044* (2013.01); *G02B 2027/014* (2013.01); *H04N 13/025* (2013.01); *H04N 13/0239* (2013.01)

(56) References Cited

U.S. PATENT DOCUMENTS

| | | | |
|---|---|---|---|
| 2008/0048234 A1 | 2/2008 | Arai et al. | |
| 2010/0079356 A1 | 4/2010 | Hoellwarth | |
| 2013/0142393 A1* | 6/2013 | Lord | G06K 9/00805 382/105 |
| 2013/0215109 A1* | 8/2013 | Miesnieks | G06T 19/006 345/419 |
| 2013/0328928 A1* | 12/2013 | Yamagishi | G02B 27/017 345/633 |
| 2014/0229866 A1* | 8/2014 | Gottlieb | H04L 65/403 715/758 |
| 2015/0074558 A1* | 3/2015 | Haskins | G06Q 10/1093 715/753 |

FOREIGN PATENT DOCUMENTS

| | | |
|---|---|---|
| JP | 07-311362 A | 11/1995 |
| JP | 2003-118423 A | 4/2003 |
| JP | 2004-109995 A | 4/2004 |
| JP | 2005-086328 A | 3/2005 |
| JP | 2008-304268 | 12/2008 |
| JP | 2010-083205 A | 4/2010 |
| JP | 2012-042654 | 3/2012 |
| JP | 2012-141461 | 7/2012 |
| JP | 2012-222628 A | 11/2012 |
| WO | WO 2013052855 A2 * 4/2013 ......... G02B 27/0093 |

\* cited by examiner

CONTROLLING REPRODUCTION OF CONTENT IN A HEAD-MOUNTED DISPLAY

CROSS REFERENCE TO RELATED APPLICATIONS

This application claims the benefit of Japanese Priority Patent Application JP 2013-262926 filed Dec. 19, 2013, the entire contents of which are incorporated herein by reference.

TECHNICAL FIELD

A present technology disclosed in the present specification relates to an image display device which is used to view an image by being worn on the head or the face, and a method of displaying an image.

BACKGROUND ART

An image display device which is used to view an image by being worn on a head or a face, that is, a head-mounted display, has been generally used. In the head-mounted display, for example, an image display unit is disposed for each of the left and right eyes, and an enlarged virtual image of a displayed image is formed by a virtual image optical system, and thereby a user can observe an image with a sense of reality. Popularity of the head-mounted display is very high. As mass production proceeds from now on, every person might come to have one head-mounted display as cell phones, smart phones, and hand held game machines have spread.

The head-mounted display is equipped with display panels of high resolution made of, for example, a liquid crystal or an organic Electro-Luminescence (EL) element and the like as display units for the left and right eyes. In addition, the head-mounted display can be classified into a light-shielding type and a permeable type. The light-shielding head-mounted display is configured to directly cover the eyes of a user when worn on a head, and a sense of immersion is increased when the user views an image. A display screen is photographed in an enlarged manner using a virtual image optical system and is observed by a user as an enlarged virtual image which is at an appropriate angle of view, and it is possible to reproduce a sense of reality such as that when viewing in a movie theater when multi-channels are reproduced in a headset (for example, refer to PTL 1). On the other hand, in case of a transmitting head-mounted display, a user can view (that is, see-through) an external landscape over an image while wearing the head-mounted display and the image is displayed (for example, refer to PTL 2).

Whichever type between the light-shielding type and the permeable type the head-mounted display is, the head-mounted display draws a user wearing the head-mounted display into a virtual world. Therefore, it is of concern that sight and hearing of the user are slow to respond to the oat side world.

For example, a sight device which includes a function of stopping an image when an emergency button provided in a remote controller is pressed, and can be worn on a head has been proposed (for example, refer to PTL 3). However, a user of the sight device has to determine whether to stop an image or not by pressing the emergency button himself. That is, the user has to care about what is happening in the outside world while viewing an image, and receives interference from the real world, and a degree of immersion in a virtual world displayed by the sight device is lowered. Furthermore, if observing the outside world by pressing the emergency button to stop an image, there is an errand which is not important, thereby causing a disturbance in viewing an image.

In addition, a mounted display device which occupants of a car wear on the face to use is a device configured to detect an emergency state of the car, and detects a state in which a posture of the occupant becomes unstable or dangerous when a brake pedal is suddenly stepped on, steering is suddenly turned off, and the car collides with and rear-ends an object during a movement of the car as an emergency state to allow an outside world to be seen the detected emergency state has been proposed (for example, refer to PTL 4).

Moreover, an image display device which is worn on a face of a user and is equipped with a predetermined sensor to allow the outside world to be seen by instantly opening a shielding unit by a sudden movement, or an impact or a sound caused by an external factor has been proposed (for example, refer to PTL 5).

CITATION LIST

Patent Literature

[PTL 1]
Japanese Unexamined Patent Application Publication No. 2012-141461
[PTL 2]
Japanese Unexamined Patent Application Publication No. 2012-42654
[PTL 3]
Japanese Unexamined Patent Application Publication No. 6-78248
[PTL 4]
Japanese Unexamined Patent Application Publication No. 2000-111830
[PTL 5]
Japanese Unexamined Patent Application Publication No. 5-304646
[PTL 6]
Japanese Unexamined Patent Application. Publication No. 2008-304268

SUMMARY

Technical Problem

It is desirable to provide an excellent image display device which is worn on a head or a face and is used to view an image, and an image display method.

It is more desirable to provide an excellent image display device by which a user wearing the image display device can view a displayed image and be immersed in a virtual world, and appropriately cope with an event occurring in a real world while viewing an image, and an image display method.

Solution to Problem

According to an embodiment of the present disclosure, an apparatus may include circuitry configured to control reproduction, at a head-mounted display device, of content, based on a determination of importance of an event occurring around the head-mounted display device.

According to an embodiment of the present disclosure, an apparatus may include circuitry configured to control reproduction, by a head-mounted display device, of content, based on an importance of an event occurring around the head-mounted display device.

According to an embodiment of the present disclosure, a method may include controlling, by a hardware device, reproduction, at a head-mounted display device, of content, based on a determination of importance of an event occurring around the head-mounted display device.

According to an embodiment of the present disclosure, an apparatus may include circuitry configured to control reproduction of an image captured around a head-mounted display device and content, based on an event occurring around the bead-mounted display device.

Advantageous Effects of Invention

According to the present technology disclosed in the present specification, an excellent image display device which enables a user wearing the image display device to view a displayed image in order to immerse into a virtual world, and to appropriately cope with an event occurring in a real world while viewing an image, and an image display method can be provided.

In the image display device according to the present technology disclosed in the present specification, it is possible to monitor an event occurring in the real world using various types of sensors and the like and to notify a user of the event corresponding to importance of the event. Accordingly, the user can quickly cope with an event with high importance while viewing a displayed image, and can immerse in a virtual world providing a displayed image and fully enjoy the displayed image without an interruption in viewing for an event with low importance.

Effects described herein are only exemplifications, and the effects of the present technology are not limited thereto. In addition, the present technology has additional more effects in addition to the effects described above in some cases.

Other objects, features, and advantages of the technology disclosed in the present, specification will be apparent by more detailed description based on embodiments to be described below or accompanying drawings.

DESCRIPTION OF EMBODIMENTS

Hereinafter, embodiments of a present technology disclosed in the present specification will be described in detail referring to drawings.

Figure 1:
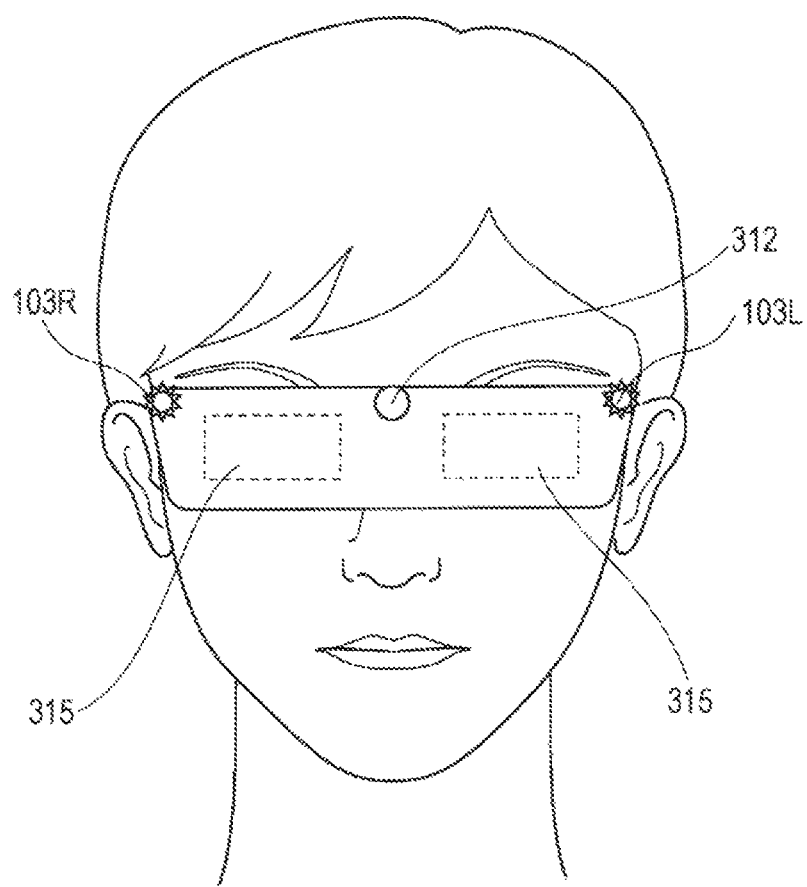
FIG. 1 is a view illustrating an appearance of a user who wears a head-mounted display on a head when viewed from the front.

FIG. 1 shows an appearance of a user who wears a head-mounted display 100, to which a present technology disclosed in the present specification is applied, on a head when viewed from a front.

The head-mounted display 100 directly covers eyes of a user when being worn on a head or a face of the user, thereby giving a sense of immersion to a user viewing an image. In addition, unlike a see-through method type, a user who wears the head-mounted display 100 may not directly view a landscape of a real world. However, a user can indirectly view (that is, a landscape can be displayed in a video see-through method) a landscape of a real world by equipping an external camera 312 photographing a landscape in a visual line direction of a user and displaying a photographed image by the external camera. Of course, it is possible to superimpose a virtual displayed image such as an Augmented Reality (AR) image and the like to a video see-through image to be shown. Moreover, since the displayed image is not shown from outside (that is, by other people), privacy is easily protected when information is displayed.

The head-mounted display 100 shown in FIG. 1 is a structure similar to a hat shape, and is configured to directly cover the left and right eyes of a user who wears the head-mounted display. At positions facing the left and right eyes inside the head-mounted display 100 main body, a display panel (not illustrated in FIG. 1) for a user to observe is provided. The display panel is configured to have a micro-display such as an organic EL element, a liquid crystal display or the like, or a laser scanning method display such as a retina direct display and the like.

Substantially at a center of the head-mounted display 100 main body front surface, an external camera 312 for inputting (sight of a user) surrounding images is provided. In addition, microphones 103L and 103R are provided in the vicinity of both left and right ends of the head-mounted display 100 main body, respectively. By having the microphones 103L and 103R substantially symmetrically left and right, and by recognizing only a sound localized at the center (voice of a user), the sound can be separated from surrounding noises or voices of other people, and thereby it is possible to prevent malfunction during an operation by, for example, a sound input.

Moreover, a touch panel 315 on which a user can touch-input, using a fingertip and the like is provided outside the head-mounted display 100 main body. In an illustrated example, the head-mounted display 100 main body includes a pair of left and right touch panels 315; however, a single, or three or more touch panels 315 may be included.

Figure 2:
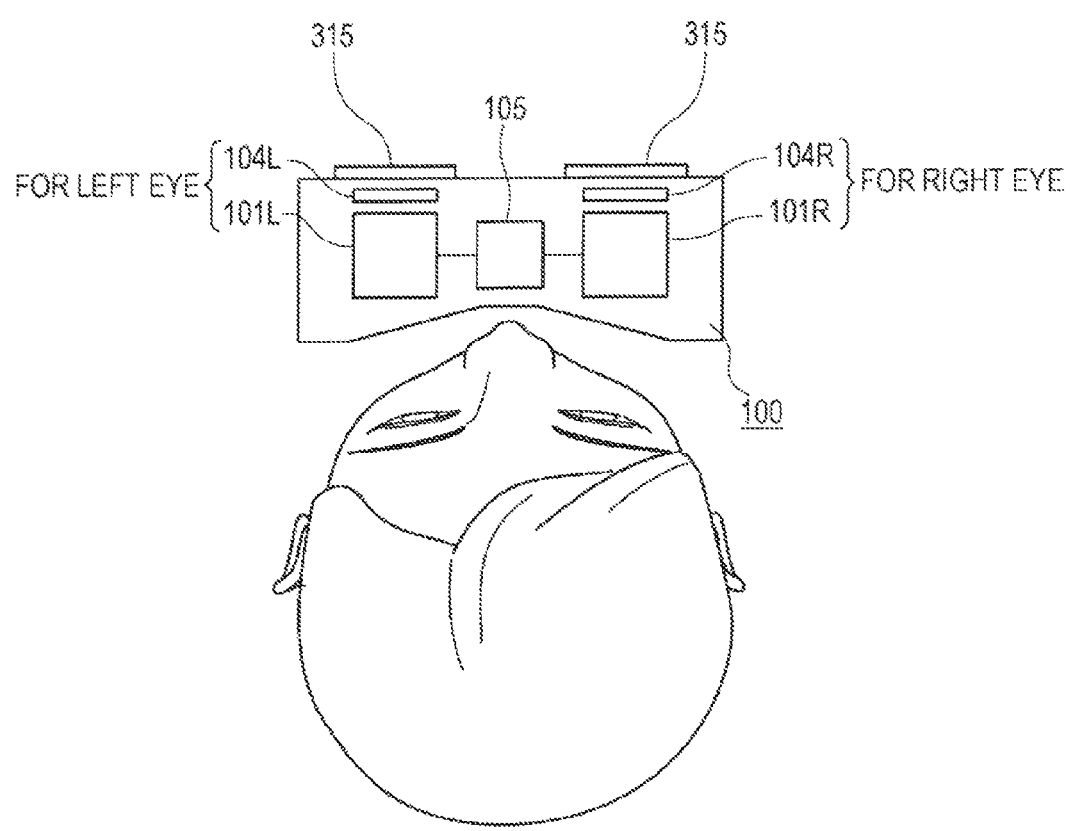
FIG. 2 is a view illustrating an appearance of the user who wears the head-mounted display shown in FIG. 1 when viewed from the top.

FIG. 2 shows an appearance of the user who wears the head-mounted display 100 shown in FIG. 1 when viewed from a top. The head-mounted display 100 illustrated has display panels 104L and 104R for the left eye and the right eye at a side surface facing a face of a user. The display panels 104L and 104R are configured to have the micro-display such as the organic EL element, the liquid crystal display or the like, or the laser scanning method display such as the retina direct display and the like. The displayed images on the display panels 104L and 104R are observed by a user as an enlarged virtual image when passing through virtual image optical units 101L and 101R. Moreover, since there are individual differences for each user in height of eyes and eye width, it is necessary to align each of left and right display systems with eyes of the user wearing the head-mounted display. In an example shorn in FIG. 2, the head-mounted display is equipped with an eye width adjustment mechanism 105 between the display panel 104R for the right eye and the display panel 104L for the left eye.

Figure 3:
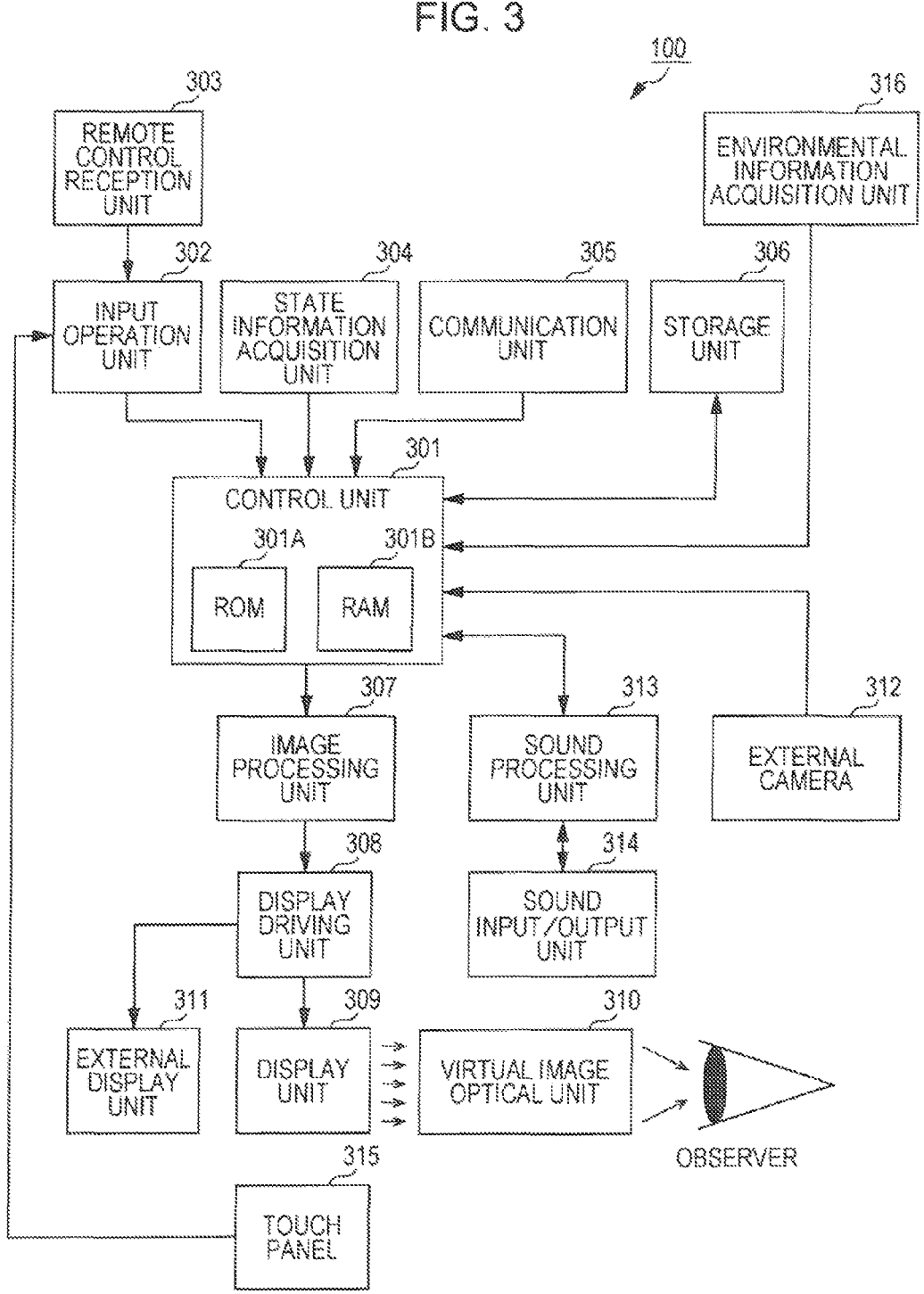
FIG. 3 is a diagram illustrating an internal configuration example of the head-mounted display.

FIG. 3 shows an internal configuration example of the head-mounted display 100. Hereinafter, each unit will be described.

A control unit 301 includes a Read Only Memory (ROM) 301A and a Random Access Memory (RAM) 301B. A program-code performed by the control unit 301 and various types of data are stored in the ROM 301A. In one embodiment, the control unit 301 may include a computer processing unit (CPU) or like device that executes a program stored in memory, such as the ROM 301A, to perform functions and operations in accordance with the present disclosure. In another embodiment, the control unit 301 may include circuitry that performs functions and operations in accordance with the present disclosure. The control unit 301 starts a display control of an image and generally controls operations of the entire head-mounted display 100 by performing a program loaded to the RAM 301B. As the program or data stored in the ROM 301A, a display control program of an image such as reproduction of moving image content and the like, a communication control program which enables a user viewing a displayed image to communicate with a real world, identification information unique to the head-mounted display 100, and user attribute information of a user to use the head-mounted display 100 can be exemplified.

An input operation unit 302 includes at least one operator (none shown) with which a user performs an input operation such as keys, buttons, switches and the like, receives an instruction of a user through the operator, and outputs the instruction to the control unit 301. In addition, the input operation unit 302 receives an instruction of a user which is received by the remote control reception unit 303 and is made of remote control commands, and outputs the instruction to the control unit 301. In addition, when a user performs a touch operation using a fingertip on the touch panel 315 provided outside the head-mounted display 100 main body, the input operation unit 302 outputs input information such as coordinate data of a touched fingertip position and the like to the control unit 301.

The state information acquisition unit 304 is the head-mounted display 100 main body or a functional module which acquires state information of a user wearing the head-mounted display 100. The state information acquisition unit 304 may be equipped with various types of sensors for detecting state information itself, and may acquire the state information through a communication unit 305 (to be described later) from an external apparatus (for example, a smart phone, a wrist watch, and other multi-functional terminals that are worn by a user) including some or all of the sensors.

The state information acquisition unit 304 acquires, for example, a position of a user's head, a posture, or posture information. In order to acquire position and posture information, the state information acquisition unit 304 may include any one of a Gyro-sensor, an acceleration sensor, a Global Positioning System (GPS) sensor, a geomagnetic sensor, a Doppler sensor, an infrared sensor, a radio field intensity sensor, or may include a combination of two or more of these sensors, considering an advantage and weakness of each sensor. Moreover, the state information acquisition unit 304 may combine information supplied from various types of infrastructures such as mobile phone base station information, PlaceEngine (registered trademark) information (electrical measurement information from a wireless LAN access point), or the like, and use the combined information so as to obtain the position and posture information.

Moreover, the state information acquisition unit 304, as state information of a user wearing the head-mounted display 100, for example, acquires, for example, an operation state of a user (whether the user wears the head-mounted display 100 or not), an action state of a user (a moving state such as a standstill, walking, running, and the like, gesture by a hand or a fingertip, an open or closed state of an eye, a visual line direction, a size of pupil), a mental state (whether or not a user was immersed in observing a displayed image, and the like), and even a physiological state. Moreover, the state information acquisition unit 304 may include the external camera 312, various types of state sensors such as a mounted sensor made of a machine switch and the like, an internal camera photographing a face of a user, a gyro-sensor, an acceleration sensor, a speed sensor, a pressure sensor, a temperature sensor for detecting a body temperature or a temperature, a sweat sensor, a pulse sensor, a myoelectric potential sensor, a potential eye sensor, a brain wave sensor, a breath sensor, a gas ion concentration sensor, and the like, and a timer (none shown) so as to obtain this state information from a user.

The environmental information acquisition unit 316 is a functional module which obtains information on the head-mounted display 100 main body or an environment surrounding a user wearing the head-mounted display 100. As the information on an environment mentioned here, a sound, an air volume, a temperature, an atmospheric pressure, an atmosphere (smoke, fog, an electromagnetic wave to which the head-mounted display 100 or a user is exposed (ultraviolet light, blue light, radio wave), a heat ray (infrared ray), radiation, carbon monoxide or carbon dioxide in the atmosphere, oxygen, nitrogen compounds (nicotine), nitrogen oxide ($NO_x$) drifting in the air or hydrocarbons in the air (Volatile Organic Compounds (VOC), or photochemical smog which is generated by a photochemical reaction between these caused by an influence of ultraviolet rays, particulate matter, pollen, dust such as house dust and the like, hazardous chemical substances such as asbestos and the like) drifting in the air, and other environmental factors can be exemplified. The environmental information acquisition unit 316 may be equipped with various types of environmental sensors including a sound sensor and an air volume sensor so as to detect environmental information. The microphones 103L and 103R, or the external camera 312 described above can be included in the environmental sensor. Alternatively, the environmental information acquisition unit 316 may acquire environmental information through the communication unit 305 (to be described below) from an external apparatus including some or all of these sensors (for example, a smart phone, a wrist watch, or a multifunctional terminal that a user is wearing).

The external camera 312 can be disposed, for example, substantially at a center of the head-mounted display 100 main body front surface (refer to FIG. 2) to photograph surrounding images. A user can adjust a zoom of the external camera 312 through an operation of the input operation unit 302 and a size of eyes recognized by an internal camera, a myoelectric potential sensor, or the like or a sound input. In addition, by performing a posture control in pan, tilt, and roll directions of the external camera 312 according to a visual line direction of a user acquired by the state information acquisition unit 304, it is possible to photograph an image in a user's own eye, that is, an image in a visual line direction of a user using the external camera 312. It is possible to output a photographed image by the external camera 312 to a display unit 309 to be displayed, and to transmit the photographed image from the communication unit 305 or to store the photographed image in a storage unit 306.

It is more preferable to configure the external camera 312 of a plurality of cameras so that the external camera 312 can acquire three-dimensional information of surrounding images by using parallax information. In addition, by only using one camera, it is possible to perform photographing while moving the camera by using Simultaneous Localization and Mapping (SLAM) image recognition, to calculate the parallax information (for example, refer to PTL 6) by using a plurality of frame images which are chronologically successive, and to acquire three-dimensional information of surrounding images from the calculated parallax information.

The external camera 312 can acquire three-dimensional information and can be also used as a distance sensor. Alternatively, a distance sensor which is made of a cheap device such as a Position Sensitive Detector (PSD) and the like that detects a reflected signal from an object may be used with the external camera 312. The external camera 312 and the distance sensor can be used to detect a body position, a posture, and a shape of a user wearing the head-mounted display 100.

The communication unit 305 performs communication processing with an external apparatus, modulation and demodulation processing, and coding and decoding processing of communication signals. As the external apparatus, a content reproduction device (Blu-ray disc or DVD player) which provides view content when a user uses the head-mounted display 100, or a streaming server can be exemplified. In addition, the control unit 301 sends out transmission data to the external apparatus from the communication unit 305.

A configuration of the communication unit 305 is optional. It is possible to configure the communication unit 305 according to a communication method to be used in transmitting and receiving operations to/from an external apparatus which is a communication partner. The communication method may be in either wired or wireless forms. As a communication standard referred to herein, Mobile High-definition Link (MHL) or Universal Serial Bus (USB), High Definition Multimedia Interface (HDMI: registered trademark), Wireless Fidelity (Wi-Fi: registered trademark), Bluetooth (registered trademark) communication or Bluetooth (registered trademark) Low Energy (BLE) communication, Ultra-low-power consuming wireless communication such as ANT and the like, and Mesh network that is standardized in IEEE802.11s and the like can be exemplified. Alternatively, the communication unit 305 may be a cellular wireless transceiver which operates according to standards such as Wideband Code Division Multiple Access (W-CDMA), Long Term Evolution (LTE), and the like.

The storage unit 306 is a large capacity storage device which is configured to have a Solid State Drive (SSD) and the like. The storage unit 306 stores an application program performed by the control unit 301 or various types of data. For example, content that a user views using the head-mounted display 100 is stored in the storage unit 306.

An image processing unit 307 further performs signal processing such as image quality correction with respect to an image signal output from the control unit 301 and the like, and converts its resolution to a resolution according to a screen of the display unit 309. Then, the display driving unit 308 sequentially selects each row of pixels of the display unit 309, and line-sequentially scans each row of the pixels of the display unit 309, thereby supplying a pixel signal based on an image signal which is signal-processed.

The display unit 309 has display panels 104L and 104R (described above) which are configured to have a microdisplay such as an electro-luminescence (EL) element, a liquid crystal display, or the like, or a laser scanning method display such as a retina direct display or the like. The virtual image optical unit 310 photographs a displayed image of the display unit 309 in an enlarging manner, and allows a user to observe the displayed image as an enlarged virtual image. As the displayed image output onto the display unit 309, an image of a virtual world referred, to as commercial content supplied from the content reproduction device (Blu-ray disc or DVD player) or the streaming server, or an image of a real world photographed using the external camera 312 can be exemplified.

In addition, as an optional configuration element of the head-mounted display 100, the external display unit 311 may be included. The external display unit 311 displays an external image which is available for an outsider who does not wear the head-mounted display 100 to observe. The external image may be the same as an image (that is, inside image) displayed on the display unit 309 or may be a different image. The image processing unit 307 performs even a signal correction such as an image quality correction of an external image and the like. In addition, the display driving unit 308 sequentially selects each row of pixels of the external display unit 311, and line-sequentially scans each row of the pixels of the external display unit 311, thereby supplying a pixel signal based on an image signal which is signal-processed.

A sound processing unit 313 further performs a sound quality correction or a sound amplification for an sound signal output from the control unit 301, and signal processing of an input sound signal and the like. Then, a sound input/output unit 314 outputs a sound after sound processing to the outside and inputs a sound from the microphones 103L and 103R (described above).

The head-mounted display 100 as shown in FIGS. 1 and 2 has light-shielding properties, that is, the head-mounted display covers eyes of a user wearing the head-mounted display. Then, moving image content such as a movie and the like or images expressed in computer graphics and the like are displayed on the display unit 309. The virtual image optical unit 310 photographs displayed images on the display unit 309 in an enlarging manner, and allows a user to observe the displayed image as an enlarged virtual image which is at an appropriate angle of view, thereby reproducing a sense of reality such as that when viewing in, for example, a movie theater. The user can immersively experience a virtual world displayed on the display unit 309.

In a state when a user wearing the head-mounted display 100 views images and listens to sounds of reproduced content, information from the outside world is blocked. This is a preferable state in a sense that the user can immerse in the reproduced content. A user who enjoys content does not want to get interference from a real world. However, it is of concern that the user is no longer able to communicate with the real world. When perception such as sight, hearing, or the like are of the virtual world even if a body of the user is in the real world, communication with the real world becomes significantly difficult. When a specific person approaches in the real world, the user wants to know the situation, but it is difficult, for the user to correspond to the situation with the head-mounted display 100 on a head. Moreover, since sight or hearing of the user is toward the virtual world, there is a possibility that it is difficult for the user to sense and avoid contact or collisions with an object in the real world when immersing in the virtual world, and thereby the user may have physical harm.

Of course, even in case of a permeable head-mounted display rather than a light-shielding head-mounted display 100 shown in FIGS. 1 and 2, since a user is drawn into the virtual world to some extent, the user has the same problems of difficulty of communicating with the real world when immersed in the virtual world, and of possible physical damages.

Therefore, the head-mounted display 100 to which the present technology disclosed in the present specification is applied monitors an event occurring in the real world when displaying an image of the virtual world on the display unit 309, and controls communication between a user who views content reproduced in the head-mounted display 100 and the real world according to importance of the occurring event. Accordingly, the user can immerse in the virtual world, without receiving interference from the real world, and performs communication with the real world when necessary, thereby appropriately coping with an important event occurring in the real world or avoiding a physical damage by collision with an object in the real world and the like.

Embodiment 1

Figure 4:
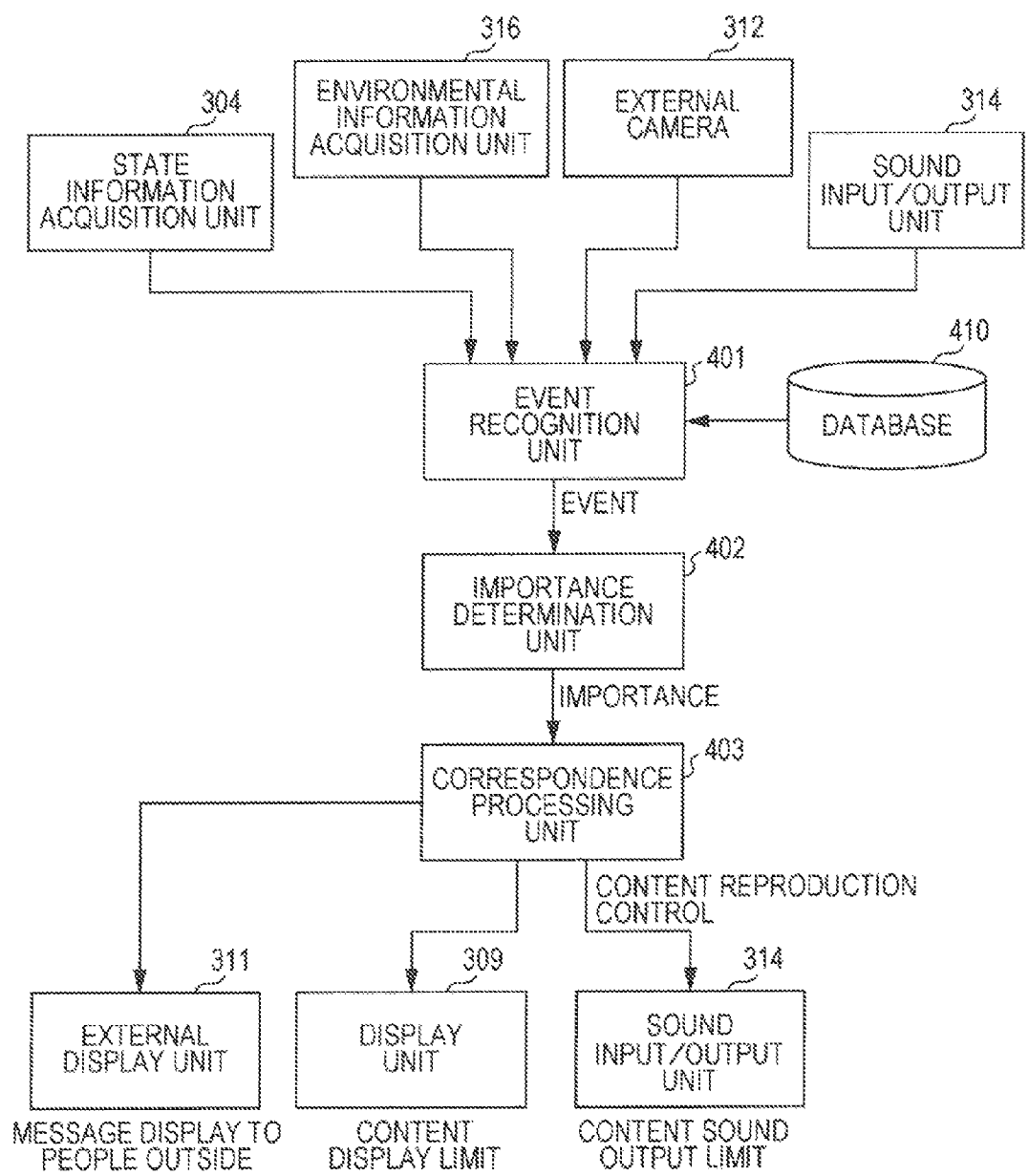
FIG. 4 is a diagram schematically illustrating a functional configuration (first embodiment) for enabling a user wearing the head-mounted display to appropriately cope with a real world.

FIG. 4 schematically shows a functional configuration for enabling a user who wears the head-mounted display 100 and views content, that is, immerses in a virtual world, to appropriately cope with a real world. The head-mounted display 100 illustrated includes an event recognition unit 401, an importance determination unit 402, and a correspondence processing unit 403. These functional modules 401 to 403 are realized by an application program performed using, for example, the control unit 301.

The event recognition unit 401 receives a signal from a sensor made of the state information acquisition unit 304, the environmental information acquisition unit 316, the external camera 312, the sound input/output unit 314, and the like, and recognizes an event occurring in a real world in real time. For example, the event recognition unit 401 performs image recognition or face recognition on a photographed image by the external camera 312, and identifies a person, an animal, a moving object, or the like approaching a user. Alternatively, the event recognition unit 401 performs sound recognition on a sound input from the sound input/output, unit 314, and identifies whose sound the sound is. In addition, the event recognition unit 401 can recognize events such as disaster like fire, earthquake, tsunami or the like, traffic accidents and the like based on not only an object but also environmental information (for example, perception of abnormally high temperature, smoke, and the like) input from the environmental information acquisition unit 316.

The importance determination unit 402 determines importance of an event recognized by the event recognition unit 401. For example, when identifying a person, a pet, a moving object, and the like from a photographed image by the external camera 312, the event recognition unit 401 determines importance of the identified person, animal, and object. When a person is recognized, the importance determination unit 402 determines importance based on a relationship or a human relationship of a boss, a subordinate, and the like at work. Moreover, when an animal is recognized, the importance determination unit 402 determines importance based on a relationship between oneself and one's own pet, livestock, or the like, or whether or not a nature of the pet or livestock is ferocious, dangerous or the like. In addition, when an object is recognized, the importance determination unit 402 determines importance based on whether the object is a car or a moving object such as a car or the like, whether a user is present in a travelling direction of the object, and whether a stationary object such as a table, a chair, or the like is placed in a travelling direction of a user. Moreover, when an event, such as disasters such as fire and the like, traffic accidents, or the like is recognized, the importance determination unit 402 determines importance based on whether a place in which an event occurs exists in a travelling direction of a user.

The importance determination unit 402 may determine importance of a recognized event referring to a database 410 which defines importance of each event in advance based on a human relationship such as a relationship and the like. The database 410 may be arranged in the head-mounted display 100, and may toe a service provided by using a cloud technology over the internet. Alternatively, a user may define importance of each person in advance (for example, high importance for a parent or child, medium importance for a sibling, low importance for others, high importance for a boss, and medium importance for a subordinate).

The correspondence processing unit 403 performs processing corresponding to importance determined by the importance determination unit 402 and performs communication between a user who views reproduced content and the real world. The correspondence processing unit 403 controls reproduction of content according to level of importance, thereby appropriately limiting viewing of content and enabling a user to perceive an event occurring in a real world using sight or hearing. Moreover, the correspondence processing unit 403 does not limit viewing of content when the importance of a recognized event is low, and thereby a user can immerse in a virtual world without receiving interference from a real world.

The correspondence processing unit 403 performs the following processings.
(1) Stop reproducing content
(2) Limit on a display of content
(3) Limit on sound of content
(4) Ignore events When the correspondence processing unit 403 completely stops reproducing content, sight and hearing of a user is released in a real world from a virtual world, and the user can completely and quickly communicate with the real world. When stopping reproducing of content, the correspondence processing unit 403 displays a photographed image by the external camera 312 on the display unit 309, and enables the user to indirectly view (that is, display a landscape in a video see-through method) a landscape of the real world. Moreover, the correspondence processing unit 403 photographs an image in a user's own eye, that is, an image in a visual line direction of a user using the external camera 312 by performing a posture control in pan, tilt, roll directions of the external camera 312 according to the visual line direction of a user acquired by the state information acquisition unit 304. It is preferable that the correspondence processing unit 403 completely stop reproducing content when the importance of a recognized event is the highest.

Moreover, the correspondence processing unit 403 releases some or all of the sight of a user from a virtual world into a real world by limiting only a display of reproduced content. For example, a displayed image on the display unit 312 is switched from a reproduced image of content to a photographed image by the external, camera 312, and thereby a user's sight is completely released from a virtual world to a real world. Alternatively, the correspondence processing unit 403 does not completely switch the reproduced image of content to the photographed image by the external camera 312, but displays the photographed image as a sub-screen, displays the reproduced image of content as a sub-screen of the screen on which to display the photographed image, and displays a mixture of the reproduced image of content and the photographed image by the external camera 312, thereby partially releasing the sight of the user from a virtual world to enable the user to communicate with a real world.

Figure 8:
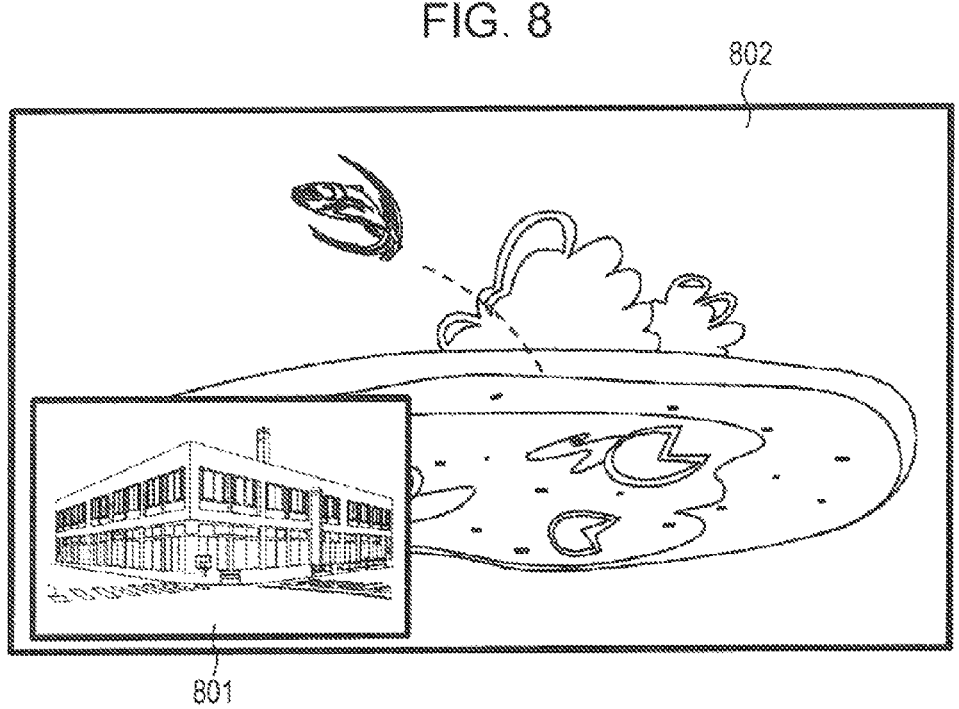
FIG. 8 is a view illustrating a state in which a video see-through image of a real world (street corner) is displayed as a sub-screen on a main screen displaying an image of a virtual world.

FIG. 8 shows a state in which a video see-through image 801 of a real world (street corner) is displayed as a sub-screen on a main screen displaying an image 802 of a virtual world. The correspondence processing unit 403 may adjust a size of a sub-screen 801 corresponding to importance of an event.

Figure 9:
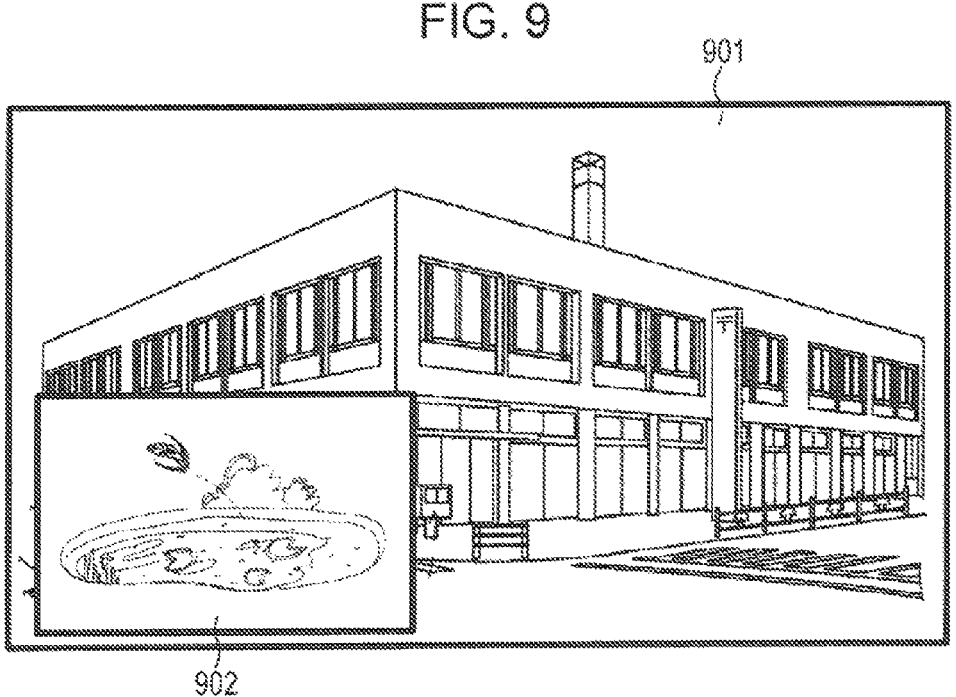
FIG. 9 is a view illustrating a state in which an image of the virtual world is displayed as a sub-screen on a main screen displaying a video see-through image of the real world (street corner).

In addition, FIG. 9 shows a state in which an image 302 of the virtual world is displayed as a sub-screen on a main screen displaying a video see-through image 901 of the real world (street corner). The correspondence processing unit 403 may adjust a size of the sub-screen 902 corresponding to importance of an event.

Figure 10:
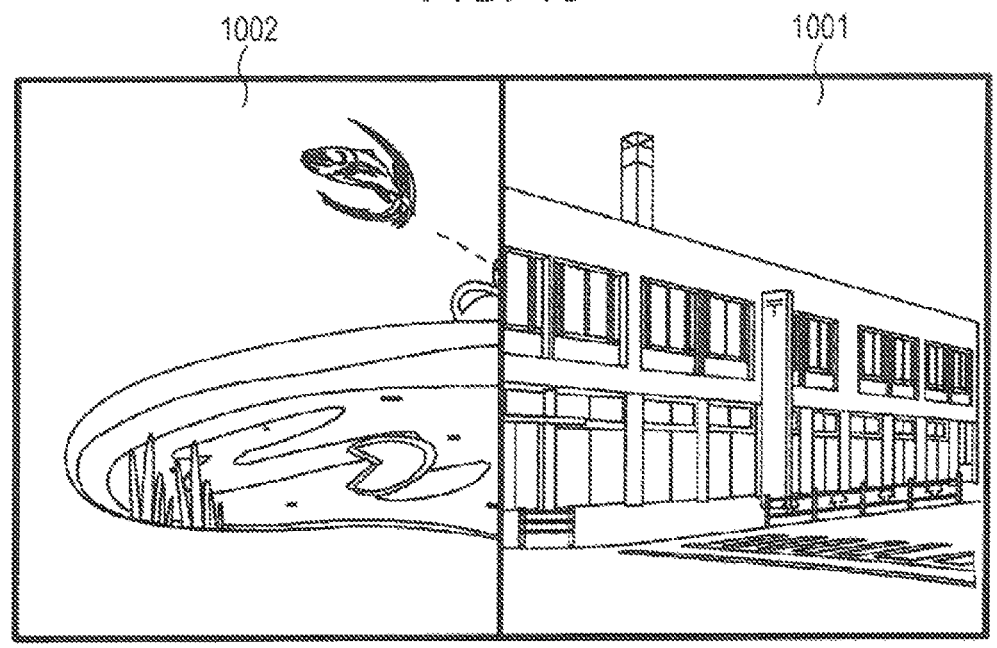
FIG. 10 is a view illustrating a state in which a video see-through image of the real world (street corner) is displayed on a right half of the screen, and an image of the virtual world is displayed on a left half of the screen.

FIG. 10 shows a state in which a video see-through image 1001 of the real world (street corner) is displayed in a screen right half, and an image 1002 of the virtual world is displayed in a screen left half by dividing the screen to a left and right. The correspondence processing unit 403 may cause a border between a video see-through image 1001 and an image 1002 of the virtual world to move to the left or the right corresponding to importance of an event.

Figure 11:
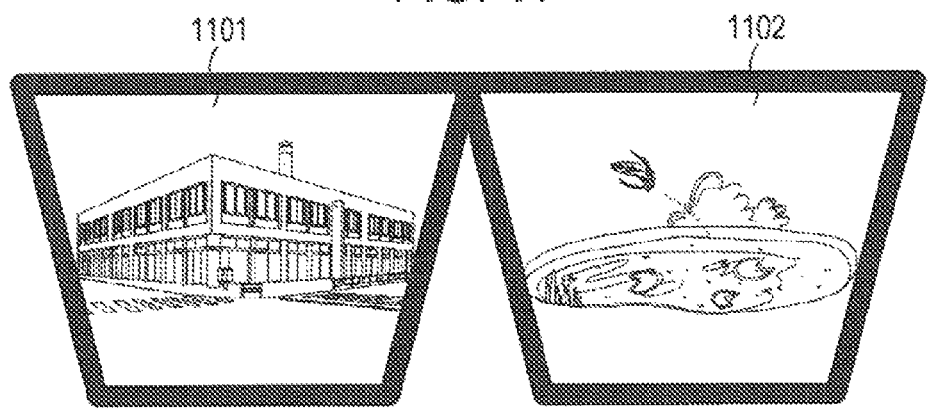
FIG. 11 is a view illustrating a state in which an image of the real world (street corner) is displayed on a left eye in a video see-through method and an image of the virtual world is displayed on a right eye of a binocular-type head-mounted display.

Furthermore, FIG. 11 shows a state in which an image 1101 of the real world (street corner) is displayed on a left eye in the video see-through method and an image 1102 of the virtual world is displayed on a right eye of a binocular-type head-mounted display 100. The correspondence processing unit 403 may insert the image 1101 of the real world (street corner) in a displayed image for the right eye at predetermined frame intervals, or adjust the frame interval at which the image 1101 of the real world (street corner) is inserted corresponding to the importance of an event.

It is preferable that the correspondence processing unit 403 enlarges a sub-screen of a photographed image, reduces a sub-screen of a content reproduced image, increases a mixture ratio of the photographed images, and the like, thereby controlling a degree to which the sight of a user is released into a real world corresponding to the importance of a recognized event. Alternatively, the correspondence processing unit 403 may notify a user of an event by allowing avatars or icons and the like which represent a recognized event to appear on an image of a virtual world instead of displaying a photographed image of a real world.

Alternatively, the correspondence processing unit 403 limits only a sound of reproduced content and releases some or all of the hearing of a user from a virtual world into a real world. For example, a sound output of reproduced content from the sound input/output unit 314 is stopped, and is switched to an input sound from the microphones 103L and 103R, and thereby a user's hearing is completely released from a virtual world into a real world. Alternatively, the correspondence processing unit 403 does not completely stop a sound of reproduced content or does not switch the sound of reproduced content to a sound of a real world, but lowers a volume of output sounds of reproduced content and increases a volume of input sounds from the microphones 103L and 103R, and the like, thereby partially releasing the hearing of a user from a virtual world and enabling the user to communicate with a real world. In addition, it is preferable that the correspondence processing unit 403 control a degree of a release of the hearing of a user into a real world corresponding to the importance of a recognized event. Alternatively, the correspondence processing unit 403 may output a sound message to notify a user of a recognized event instead of outputting sound of a real world.

Whether an image or a sound of reproduced content is limited by the correspondence processing unit 403 may be switched by a type of an occurring event, and may be selected by a user.

In addition, the correspondence processing unit 403 continuously reproduces content without releasing the sight and hearing of the user into a real world when importance of a recognized event is at the lowest level. Thus, the user can immerse in reproduced content and enjoy the content without receiving interference from the real world for insignificant errands.

Figure 5:
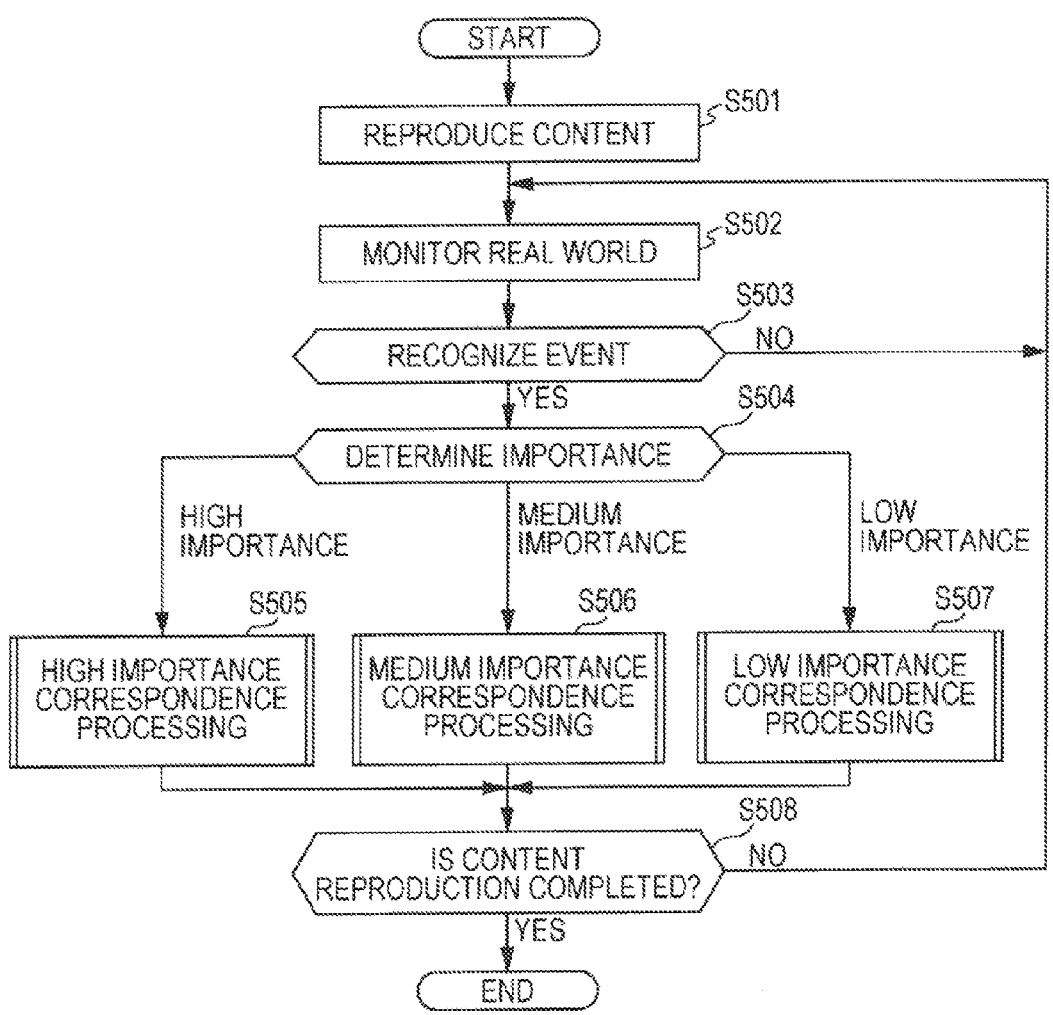
FIG. 5 is a flowchart illustrating a procedure (first embodiment) by which the head-mounted display notifies a user of an event occurring in a real world.

FIG. 5 shows a procedure by which the head-mounted display 100 notifies a user viewing content of an event occurring in a real world in a form of flowchart.

When reproduction of content is started in the head-mounted display 100 (step S501), the event recognition unit 401 receives a signal from a sensor made of the state information acquisition unit 304, the environmental information acquisition unit 316, the external camera 312, the sound input/output unit 314, and the like, and continues to monitor a real world (step S502).

When recognizing an event occurring in the real world such as who approaches and the like (Yes in Step S503), the event recognition unit 401 outputs a result of the recognition to the importance determination unit 402.

The importance determination unit 402 determines importance of a recognized event (step S504). The importance determination unit 402 may utilize the database 410 when determining importance of an event. Then, the correspondence processing unit 403 performs processing corresponding to a determined importance.

Here, when the importance of an event is determined to be high, the correspondence processing unit 403 performs processing corresponding to high importance (step S505).

For example, the correspondence processing unit 403 completely stops content which is being reproduced and releases both sight and hearing of a user from a virtual world into a real world. Accordingly, the user can completely and quickly communicate with the real world.

The correspondence processing unit 403 enables a user to indirectly view a landscape of the real world (that is, display a landscape in the video see-through method) by displaying a photographed image by the external camera 312 on the display unit 309 as processing corresponding to high importance. In addition, the correspondence processing unit 403 photographs an image in a user's own eye, that is, an image in a visual line direction of a user using the external camera 312 by performing a posture control in a pan, tilt, roll directions of the external camera 312 according to the visual line direction of a user acquired by the state information acquisition unit 304.

Moreover, when the importance of an event is determined to be medium, the correspondence processing unit 403 performs processing corresponding to medium importance (step S506).

The correspondence processing unit 403, as processing corresponding to medium importance, limits only a display of reproduced content and releases some or all of the sight of a user from a virtual world into a real world. For example, a displayed image on the display unit 312 is switched from a reproduced image of content to a photographed image by the external camera 312, and thereby a user's sight is completely released from a virtual world to a real world. Additionally, the correspondence processing unit 403 does not completely switch the reproduced image of content to the photographed image by the external camera 312, but displays the photographed image as a sub-screen, displays the reproduced image of content as a sub-screen of the screen to display the photographed image on, and displays a mixture of the reproduced image of content and the photographed image by the external camera 312, thereby partially releasing the sight of the user from a virtual world to enable the user to communicate with a real world. In addition, the correspondence processing unit 403 may perform the processing corresponding to medium importance in a stepwise manner. That is, the importance determination unit 402 finely level determines medium importance, and the correspondence processing unit 403 enlarges a sub-screen of a photographed image, reduces a sub-screen of an content reproduced image, increases a mixture ratio of the photographed images, and the like, thereby controlling a degree to release the sight of a user into a real world corresponding to the level. Moreover, the correspondence processing unit 403 may notify a user of an event by allowing avatars or icons and the like which represent a recognized event to appear on an image of a virtual world instead of displaying a photographed image of a real world.

Alternatively, the correspondence processing unit 403, as processing corresponding to medium importance, limits only a sound of reproduced content and releases some or all of the hearing of a user from a virtual world into a real world. For example, a sound output of reproduced content from the sound input/output unit 314 is stopped, and is switched to an input sound from the microphones 103L and 103R, and thereby a user's hearing is completely released from a virtual world into a real world. Additionally, the correspondence processing unit 403 may perform the processing corresponding to medium importance in a stepwise manner. That is, the importance determination unit 402 finely level determines medium importance, and the correspondence processing unit 403 lowers a volume of output sounds of reproduced content and increases a volume of input sounds from the microphones 103L and 103R corresponding to a level of the importance, thereby partially releasing the hearing of a user from a virtual world and enabling the user to communicate with a real world. In addition, the correspondence processing unit 403 may output a sound message to notify a user of a recognized event instead of outputting sound of the real world.

In addition, when the importance of an event is determined to be low, the correspondence processing unit 403 performs processing corresponding to low importance (step S507). For example, the correspondence processing unit 403 continuously reproduces content without releasing the sight and hearing of the user into a real world. Thus, the user can immerse in reproduced content and enjoy the content without receiving interference from the real world, for insignificant errands. Moreover, when an event whose importance is determined to be low is a person, the person outside is puzzled by an unclear reason that a user wearing the head-mounted display 100 is not aware of him or her, or that the user does not deal with him or her. Therefore, the correspondence processing unit 403 as processing corresponding to low importance, displays a message such as "difficult to respond to you now" or the like on the external display unit 311, or outputs the message as a sound message from the sound input/output unit 314, and thereby the user may help the person outside who does not wear the head-mounted display 100 to understand a reason for the user's non-response.

In the processing corresponding to high importance (step S505) or the processing corresponding to medium importance (step S506), the correspondence processing unit 403 limits an output of reproduced content, and then resumes normal content reproduction corresponding to an elapsed, predetermined period of time, a restore instruction of content reproduction placed via the input operation unit 302 and the like by a user, and the event recognition unit 401's unawareness of an event (or, a completed event).

Then, until reproduction of content is completed (reproduction up to the last of content is completed, including stopping reproduction by a user) (No in step S508), the correspondence processing unit 403 returns to step S502 and repeatedly performs the processings described above.

According to the present embodiment, the head-mounted display 100 controls a reproduction of content corresponding to an event occurring in a real world, so that a user can naturally communicate between a virtual world and a real world.

In addition, a user appropriately sets a reference for determining the importance of an event in the importance determination unit 402 corresponding to user's own taste, thereby reducing inhibition of content reproduction in the head-mounted display 100 as much as possible.

Moreover, in processing corresponding to each importance, a user appropriately sets a method of communicating with a real world corresponding to the user's own taste, and thereby it is possible to comfortably use the head-mounted display 100. For example, as processing corresponding to medium importance, a user can set whether to communicate with a real world by limiting either a display of reproduction content or a sound output. In addition, a user can select whether to notify of an event by a display of avatars or icons or to notify of an event by a sound message.

Embodiment 2

In the first embodiment described above, corresponding processing is performed, based on only importance of an event itself recognized by the event recognition unit 401. In contrast, in the second embodiment, importance of an event is determined, considering more a state of a user.

As the state of a user, a degree of immersion of a user in reproduced content can be exemplified. When the user immerses in the content while viewing the content, the user does not want to receive interference from a real world. Even if the same person approaches the user, the user wants neither communication nor interference from the real world, but might want to continuously view the content. In contrast, when the user does not immerse in the content while viewing the content, or the user is tired of the content, it is not uncomfortable to receive interference from a real world, but it rather becomes a mood change. Even if a person does not want to immerse in content, when a degree of immersion is low, it is preferable to limit reproduction of content and to enable the person to communicate with a real world in some cases.

Figure 6:
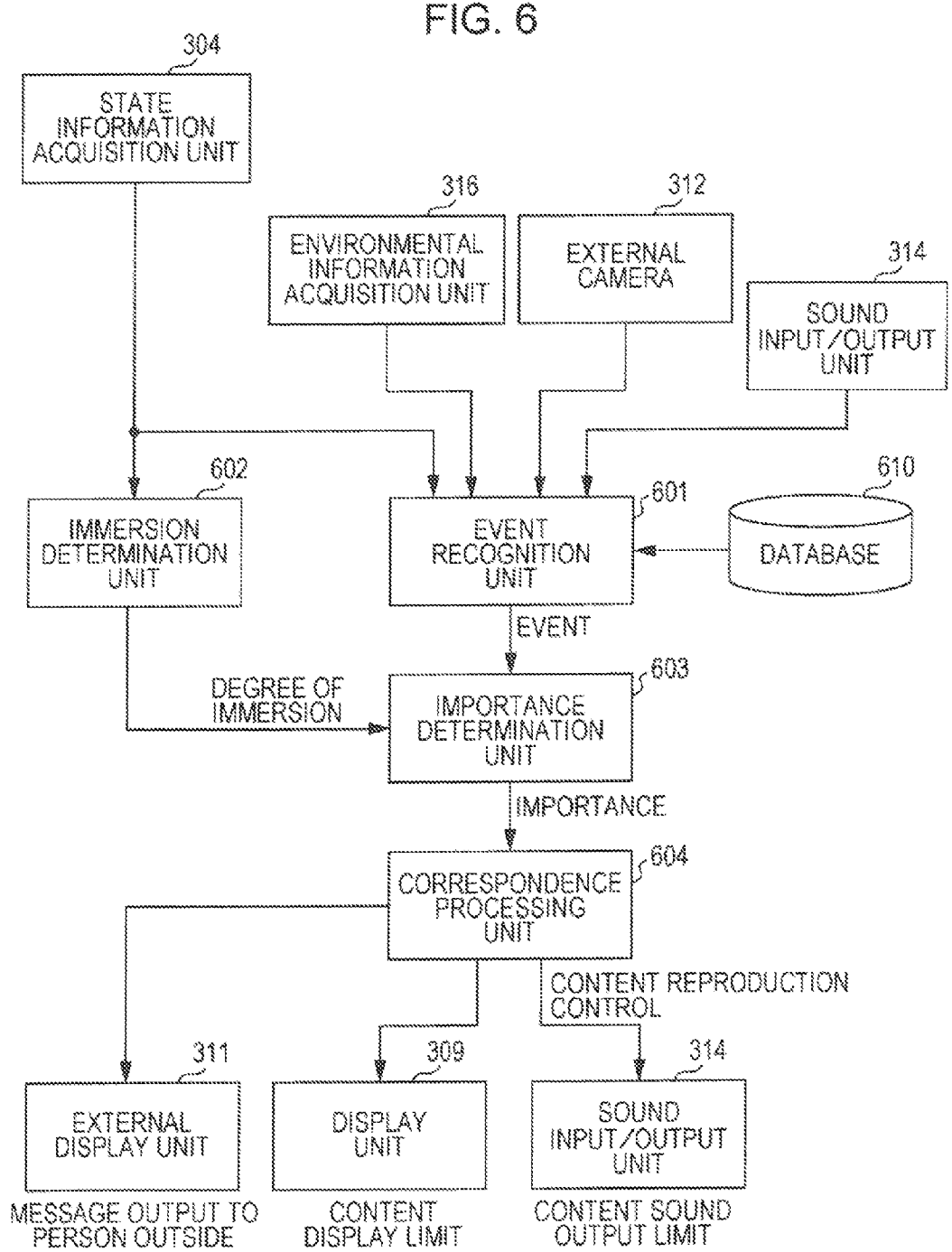
FIG. 6 is a diagram schematically illustrating a functional configuration (second embodiment) for enabling the user wearing the head-mounted display to appropriately cope with the real world.

FIG. 6 schematically shows a functional configuration in a second embodiment which enables the user wearing the head-mounted display 100 to appropriately cope with the real world. The head-mounted display 100 illustrated includes an event recognition unit 601, an immersion determination unit 602, an importance determination unit 603, and a correspondence processing unit 604. These functional modules 601 to 604 are realized by an application program performed by, for example, the control unit 301.

The event recognition unit 601 receives a signal from a sensor made of the state information acquisition unit 304, the environmental information acquisition unit 316, the external camera 312, the sound input/output unit 314, and the like, and recognizes an event occurring in a real world in real time. For example, the event recognition unit 401 performs image recognition or face recognition on a photographed image by the external camera 312, and identifies a person, an animal, a moving object, or the like approaching a user. Alternatively, the event recognition unit 601 performs sound recognition on a sound input from the sound input/output unit 314, and identifies whose sound the sound is. In addition, the event recognition unit 401 can recognize events such as disaster like fire, earthquake, tsunami or the like, traffic accidents and the like based on not only an object but also environmental information, and the like input from the environmental information acquisition unit 316.

The immersion determination unit 602 receives information which shows a state of a user such as body temperature, sweating, pulse, muscle potential, eye potential, brain waves, and the like from the state information acquisition unit 304, and determines how much a user immerses in reproduced content, that is, the virtual world.

The importance determination unit 603 determines the importance of an event recognized by the event recognition unit 601, considering a current degree of immersion of a user. The importance determination unit 603 suppresses the importance of an event when a degree of immersion of a user is high, and enhances the importance of an event when the degree of immersion of a user is low.

For example, when the degree of immersion of a user is high, by respecting a desire of not receiving interference from a real world, as long as very much the same person does not appear, or as long as an event is not a fire or an accident that the user has to urgently avoid, the importance of an event is determined to be lower than by the importance determination unit 402 (a case of Embodiment 1) even with the same event. Contrarily, when the degree of immersion of a user is low, even with the same event, the importance of an event is determined to be higher than by the importance determination unit 402 (the case of Embodiment 1). When the user is tired of viewing the content, it is not uncomfortable to receive interference from a real world, but it rather becomes a mood change. Even if a person does not want to immerse in content, when a degree of immersion is low, it is preferable to limit reproduction of content and to enable the person to communicate with a real world in some cases. The importance determination unit 603 may determine the importance of a recognized event referring to the database 610 which defines the importance of each event based on a human relationship such as a relationship in advance.

The correspondence processing unit 604 performs processing corresponding to the importance of an event determined by the importance determination unit 603, and performs communication between a user who views reproduced content and a real world. The correspondence processing unit 604 enables a user to perceive an event occurring in a real world through sight and hearing by controlling reproduction of content corresponding to a height of importance by appropriately limiting viewing of the content. In addition, when the importance of a recognized event is low, the correspondence processing unit 604 does not put a limit on viewing of content, thereby enabling a user to immerse in a virtual world without receiving interference from a real world. The correspondence processing unit 604 performs processing exemplified as follows (same as above).

Figure 7:
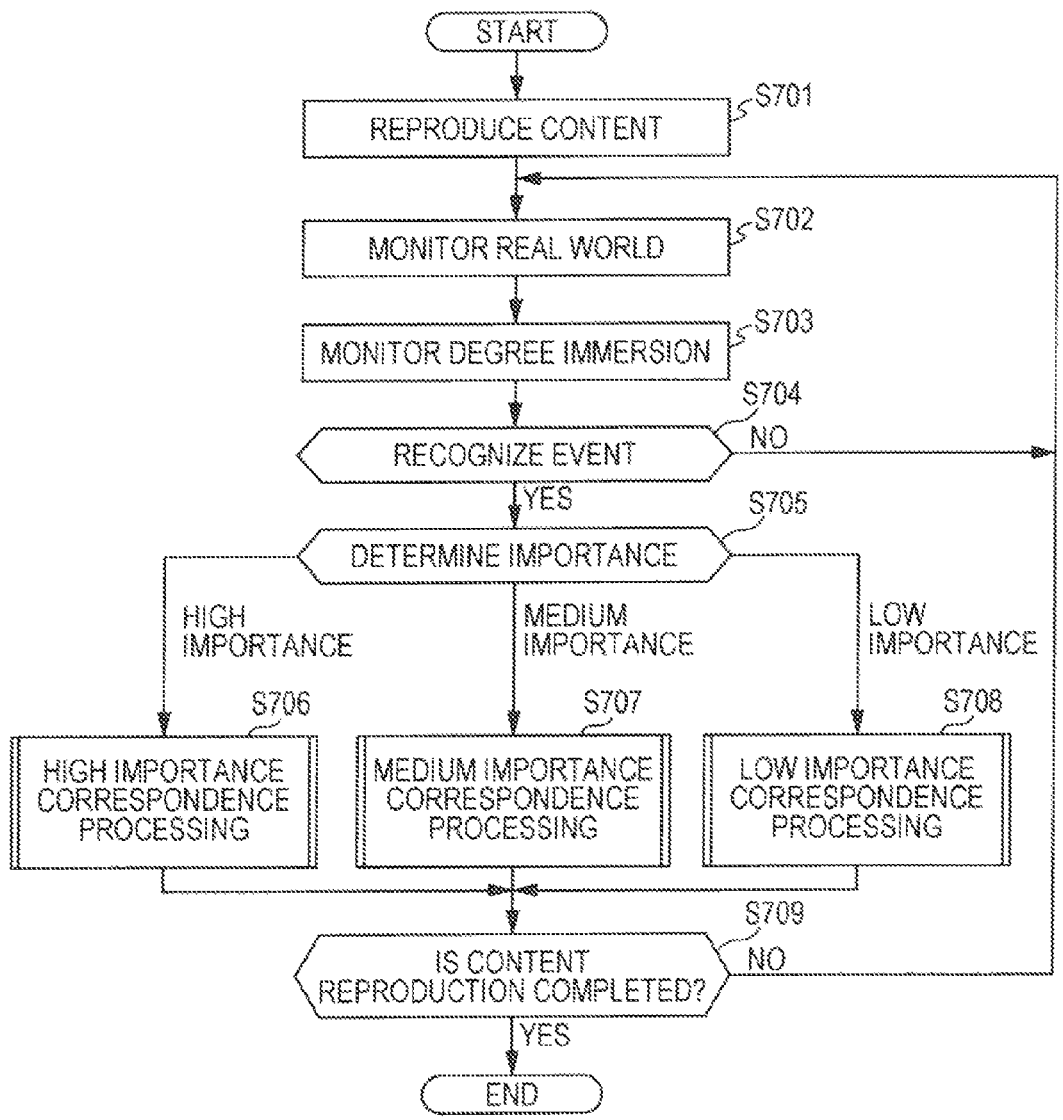
FIG. 7 is a flowchart illustrating a procedure (second embodiment) by which the head-mounted display notifies a user of an event occurring in the real world.

(1) Stop reproducing content
(2) Limit on a display of content
(3) Limit on sound of content
(4) Ignore events FIG. 7 shows a procedure that the head-mounted display 100 notifies a user viewing content of an event occurring in the real world in a flowchart form.

When starting to reproduce content in head-mounted display 100 (step S701), the event recognition unit 601 receives a signal from a sensor made of the state information acquisition unit 304, the environmental information acquisition unit 316, the external camera 312, the sound input/output unit 314, and the like, and continuously monitors a real world (step S702). In addition, the immersion determination unit 602 receives information which shows a state of a user such as body temperature, sweating, pulse, muscle potential, eye potential, brain waves, and the like from the state information acquisition unit 304, and continuously monitors a degree of immersion of a user in reproduced content, that is, a virtual world, and the like (step S703).

When the event recognition unit 601 recognizes an event occurring in a real world such as who approaches and the like (Yes in step S704), the importance determination unit 603 determines the importance of an event recognized by the event recognition unit 601, considering a current degree of immersion of a user (step S705). The importance determination unit 603 may utilize the database 610 when determining the importance of an event. Then, the correspondence processing unit 604 performs processing corresponding to the determined importance.

Here, when the importance of an event is determined to be high, the correspondence processing unit 604 performs processing corresponding to high importance (step S706). For example, the correspondence processing unit 604 releases both the sight and hearing of a user from a virtual world into a real world by completely stopping content in reproduction. Thus, the user can completely and quickly communicate with the real world.

As processing corresponding to high importance, the correspondence processing unit 604 enables a user to indirectly view a landscape of a real world by displaying an image photographed by the external camera 312 on the display unit 309 (that is, displaying a landscape in a video see-through method). In addition, the correspondence processing unit 604 photographs an image in a user's own eye, that is, an image in a visual line direction of a user, using the external camera 312 by performing a posture control in a pan, tilt, roll directions of the external camera 312 according to the visual line direction of a user acquired by the state information acquisition unit 304.

In addition, when the importance of an event is determined to be medium, the correspondence processing unit 604 performs processing corresponding to medium importance (step S707).

The correspondence processing unit 604, as processing corresponding to medium importance, limits only a display of reproduced content and releases some or all of the sight of a user from a virtual world into a real world. For example, a displayed image on the display unit 312 is switched from a reproduced image of content to a photographed image by the external camera 312, and thereby a user's sight is completely released from a virtual world to a real world. Additionally, the correspondence processing unit 604 does not completely switch the reproduced image of content to the photographed image by the external camera 312, but displays the photographed image as a sub-screen, displays the reproduced image of content as a sub-screen of the screen to display the photographed image on, and displays a mixture of the reproduced image of content and the photographed image by the external camera 312, thereby partially releasing the sight of the user from a virtual world to enable the user to communicate with a real world. In addition, the correspondence processing unit 604 may perform the processing corresponding to medium importance in a stepwise manner. That is, the importance determination unit 603 finely level determines medium importance, and the correspondence processing unit 604 enlarges a sub-screen of a photographed image, reduces a sub-screen of an content reproduced image, increases a mixture ratio of the photographed images, and the like, thereby controlling a degree to release the sight of a user into a real world corresponding to the level. Moreover, the correspondence processing unit 604 may notify a user of an event by allowing avatars or icons and the like which represent a recognized event to appear on an image of a virtual world instead of displaying a photographed image of a real world.

Alternatively, the correspondence processing unit 604, as processing corresponding to medium importance, limits only a sound of reproduced content and releases some or all of the hearing of a user from a virtual world into a real world. For example, a sound output of reproduced content from the sound input/output unit 314 is stopped, and is switched to an input sound from the microphones 103L and 103R, and thereby a user's hearing is completely released from a virtual world into a real world. Additionally, the correspondence processing unit 604 may perform the processing corresponding to medium importance in a stepwise manner. That is, the importance determination unit 603 finely level determines medium importance, and the correspondence processing unit 604 lowers a volume of output sounds of reproduced content and increases a volume of input sounds from the microphones 103L and 103R corresponding to a level of the importance, thereby partially releasing the hearing of a user from a virtual world and enabling the user to communicate with a real world. In addition, the correspondence processing unit 604 may output a sound message to notify a user of a recognized event instead of outputting sounds of the real world.

In addition, when the importance of an event is determined to be low, the correspondence processing unit 604 performs processing corresponding to low important (step S708). For example, the correspondence processing unit 604 continuously reproduces content without releasing the sight and hearing of a user into a real world. Thus, the user can immerse in reproduced content and enjoy the content without receiving interference from the real world for insignificant errands. Moreover, the correspondence processing unit 604, as processing corresponding to low importance, may display a message such as "difficult to respond to you now" or the like on the external display unit 311, or output the message as a sound message from the sound input/output unit 314. The person outside who does not wear the head-mounted display 100 can understand a reason for the user's non-response through the image or the sound message.

In the processing corresponding to high importance (step S706) or the processing corresponding to medium importance (step S707), the correspondence processing unit 604 limits an output of reproduced content, and then resumes normal content reproduction corresponding to an elapsed predetermined period of time, a restore instruction of content reproduction placed via the input operation unit 302 and the like by a user, and the event recognition unit 401's unawareness of an event (or, a completed event).

Then, until reproduction of content is completed (reproduction until the last of content is completed, including stopping reproduction by a user) (No in step S709), the correspondence processing unit 604 returns to step S702 and repeatedly performs the processings described above.

According to the present embodiment, the head-mounted display 100 controls a reproduction of content corresponding to an event occurring in a real world, so that a user can naturally communicate between a virtual world and a real world.

In addition, the importance determination unit 603 determines the importance of an event corresponding to a change of a degree of immersion of a user, so that a user can naturally adaptively communicate between the virtual world and the real world.

The present technology disclosed in the present specification can have configurations as follows:

(1) An apparatus including:
circuitry configured to control reproduction, at a head-mounted display device, of content, based on a determination of importance of an event occurring around the head-mounted display device.

(2) The apparatus according to (1),
wherein the determination of importance of the event is by an external device.

(3) The apparatus according to (1) or (2),
wherein the determination of importance of the event is by executing an application at the head-mounted display device.

(4) The apparatus according to any one of (1) to (3),
wherein the apparatus is part of the head-mounted display device.

(5) The apparatus according to any one of (1) to (4),
wherein, when the importance of the event is determined to have a first predetermined level, the circuitry stops reproduction of the content and starts reproduction of an image from a real world.

(6) The apparatus according to any one of (1) to (5),
wherein, when the importance of the event is determined to have a second predetermined level less than the first predetermined level, the circuitry only partially stops reproduction of the content and starts reproduction of the image from the real world to at least a portion of at least one of sight or hearing of a user of the head-mounted display device.

(7) The apparatus according to any one of (1) to (6), wherein, when the importance of the event is determined to have the second predetermined level, an image corresponding to the real world is displayed having a first size simultaneously with an image corresponding to the content having a second size other than the first size.

(8) The apparatus according to any one of (1) to (7), wherein, when the importance of the event is determined to have the second predetermined level, an image corresponding to the real world is displayed simultaneously with and separately from an image corresponding to the content.

(9) The apparatus according to any one of (1) to (8), wherein, when the importance of the event is determined to have a third predetermined level less than the second predetermined level, the circuitry continues reproduction of the content without reproduction of the image from the real world.

(10) The apparatus according to any one of (1) to (9), wherein, when the importance of the event is determined to have the first or the second predetermined level, the circuitry resumes reproduction of the content after elapse of a predetermined period of time.

(11) The apparatus according to any one of (1) to (10), wherein the importance of the event is determined based on a relationship of the event with a user of the head-mounted display device.

(12) The apparatus according to any one of (1) to (11), wherein the importance of the event is determined by recognizing the event.

(13) The apparatus according to any one of (1) to (12), wherein the content includes at least one of an image or sound.

(14) The apparatus according to any one of (1) to (13), wherein the determination of the importance of the event is in consideration of a degree of immersion of a user of the head-mounted display device.

(15) An apparatus including:
circuitry configured to control reproduction, by a head-mounted display device, of content, based on an importance of an event occurring around the head-mounted display device.

(16) A method including:
controlling, by a hardware device, reproduction, at a head-mounted display device, of content, based on a determination of importance of an event occurring around the head-mounted display device.

(17) An apparatus including:
circuitry configured to control reproduction of an image captured around a head-mounted display device and content, based on an event occurring around the head-mounted display device.

(18) The apparatus according to (17), wherein the circuitry is configured to start reproduction of the image captured around the head-mounted display device and stop reproduction of the content when the head-mounted display device is in a moving direction.

(A01) An image display device includes:
an image display unit which displays an image;
an event recognition unit which recognizes an event occurring in a real world;
an importance determination unit which determines importance of an event; and
a correspondence processing unit which performs processing corresponding to the importance of an event.

(A02) The image display device according to (A01) further includes a sensor unit which detects an event in the real world, in which the event recognition unit recognizes an event based on a detection result by the sensor unit.

(A03) The image display device according to (A01) further includes a photographing unit which photographs the real world,
in which the event recognition unit recognizes an event based on a photographed image by the photographing unit.

(A04) The image display device according to (A03), in which the event recognition unit performs face recognition on the photographed image to recognize an approaching person as an event.

(A05) The image display device according to (A01) further includes a sound input unit to which sound of the real world are input,
in which the event recognition unit recognizes an event based on the sound received from the sound input unit.

(A06) The image display device according to (A05), in which the event recognition unit recognizes a person in a surrounding as an event by recognizing an input sound.

(A07) The image display device according to (A01) further includes an environmental information acquisition unit which acquires information of a surround environment,
in which the event recognition unit recognizes an event based on the information of a surrounding environment.

(A08) The image display device according to any one of (A01) and (A07), in which the importance determination unit determines importance of an event based on a relationship between a user wearing the image display device on a head or a face and a recognized event.

(A09) The image display device according to any one of (A04) and (A06), in which the importance determination unit determines importance of an event based on a human relationship between the user wearing the image display device on a head or a face and a recognized person.

(A10) The image display device according to any one of (A01) to (A03), (A05), and (A07), in which the importance determination unit determines importance based on properties of a recognized event.

(A11) The image display device according to any one of (A01) to (A03), (A05), and (A07), in which the importance determination unit determines importance of a recognized event referring to a predetermined database.

(A12) The image display device according to any one of (A01) to (A03), (A05), and (A07), in which the importance determination, unit determines importance of a recognized event based on a reference decided by the user wearing the image display device on a head or a face.

(A13) The image display device according to any one of (A01) to (A03), (A05), and (A07), in which the importance determination unit determines importance of the recognized event based on movement of an object when a moving object is recognized as an event, (A14) The image display device according to any one of (A01) to (A13), in which the correspondence processing unit controls a display of images of reproduced content of the image display unit based on the importance of an event.

(A14-1) The image display device according to (A01) further includes an external display unit which displays an external image to be observed by an outsider who is not wearing the image display device,
in which the correspondence processing unit controls an external image displayed on the external display unit based on importance of an event.

(A15) The image display device according to (A14) further includes a photographing unit which photographs a real world, in which the correspondence processing unit controls a display of images of reproduced content and photographed images by the photographing unit on the image display unit according to the importance of an event.

(A16) The image display device according to (A15), in which the correspondence processing unit stops a display of images of the reproduced content to switch to a display of the photographed image, mixes the images of the reproduced content and the photographed image at a predetermined ratio, or continuously displays the images of the reproduced content, based on the importance of an event.

(A17) The image display device according to (A01) further includes a sound output unit which outputs sounds of the reproduced content,
in which the correspondence processing unit controls a sound output from the sound output unit based on the importance of an event.

(A17-1) The image display device according to (A17), in which the correspondence processing unit stops a sound output of reproduced content or adjusts a volume of sound of the reproduced content based on the importance of an event.

(A17-2) The image display device according to (A17) further includes a sound input unit to which sound of the real world are input.
in which the correspondence processing unit controls a ratio of sound of reproduced content to sounds which are input to the sound input unit and output from the sound output unit.

(A18) The image display device according to any one of (A01) to (A13) further includes an immersion determination unit which determines a degree of immersion of the user wearing the image display device on a head or a face into reproduced content displayed on the image display unit,
in which the importance determination unit determines the importance of an event considering the degree of immersion.

(A18-1) The image display device according to (A18), in which the immersion determination unit determines a degree of immersion of a user based on information which shows a state of the user such as body temperature, sweating, pulse, muscle potential, eye potential, brain waves, and the like of the user who wears the image display device on a head or a face.

(A19) The image display device according to (A18), in which the importance determination unit suppresses the importance of an event when the immersion is high, and enhances the importance of an event when the immersion is low.

(A20) An image display method includes:
recognizing an event occurring in a real world;
determining importance of an event; and
controlling a display of images on an image display unit worn on a head or a face corresponding to importance.

It should be understood by those skilled in the art that various modifications, combinations, sub-combinations and alterations may occur depending on design requirements and other factors, insofar as they are within the scope of the appended claims or the equivalents thereof.

INDUSTRIAL APPLICABILITY

As described, above, the present technology disclosed in the present specification is described in detail referring to a specific embodiment. However, it is obvious that those skilled in the art can make modifications and substitutions to the embodiments without departing from the scope of the present technology disclosed herein.

In the present specification, embodiments in which a present technology disclosed in the present specification is applied to a light-shielding head-mounted display are mainly described; however, the scope of the present technology disclosed in the present specification is not limited to thereto. It is possible to apply the present technology disclosed in the specification to various types of image display devices including a function of displaying an image of a real world and an image of a virtual world such as the transmitting head-mounted display, a head-up display, a camera-embedded smart phone, a multifunctional terminal, and the like in the same manner.

In summary, since the present technology disclosed in the present specification uses a form of exemplification is described, it is necessary not to limitedly interpret the substance disclosed in the present specification. In order to determine the scope of the present technology disclosed in the present specification, it is necessary to refer to claims.

REFERENCE SIGNS LIST 100 head-mounted display
101L, 101R virtual image optical unit
103L, 103R microphone
104L, 104R display panel
105 eye width adjustment mechanism
301 control unit
301A ROM
301B RAM
302 input operation unit
303 remote control reception unit
304 state information acquisition unit
305 communication unit
306 storage unit
307 image processing unit
308 display driving unit
309 display unit
310 virtual image optical unit
311 external display unit
312 external camera
313 sound processing unit
314 sound input/output unit
315 touch panel
316 environmental information acquisition unit
401 event recognition unit
402 importance determination unit
403 correspondence processing unit
410 database
601 event recognition unit
602 immersion determination unit
603 importance determination unit
604 correspondence processing unit
610 database

The invention claimed is:
1. An apparatus, comprising:
circuitry configured to:
receive priority information of an event that occurs in a determined vicinity of a head-mounted display device;
reproduce content, at the head-mounted display device, based on the priority information of the event that occurs in the determined vicinity of the head-mounted display device;
terminate the reproduction of the content based on the priority information that indicates a first priority level of the event; and reproduce an image from a real world based on the termination of the reproduction of the content.

2. The apparatus of claim 1, wherein the priority information of the event is determined by an external device.

3. The apparatus of claim 1, wherein the priority information of the event is based on an execution of an application at the head-mounted display device.

4. The apparatus of claim 1, wherein the apparatus is part of the head-mounted display device.

5. The apparatus of claim 1, wherein based on the priority information that indicates a second priority level that is less than the first priority level, the circuitry is further configured to:
partially stop the reproduction of the content; and
start the reproduction of the image from the real world to at least a portion of the head-mounted display device, or an audio signal.

6. The apparatus of claim 5, wherein based on the priority information that indicates the second priority level of the event, a first image corresponding to the real world and having a first size is displayed concurrently with a second image corresponding to the content, wherein a second size of the second image is different from the first size.

7. The apparatus of claim 5, wherein based on the priority information that indicates the second priority level of the event, a first image corresponding to the real world is displayed concurrently with a second image corresponding to the content.

8. The apparatus of claim 5, wherein based on the priority information that indicates a third priority level that is less than the second priority level, the circuitry is further configured to continue the reproduction of the content and disable the reproduction of the image from the real world.

9. The apparatus of claim 5, wherein based on the priority information that indicates one of the first priority level or the second priority level, the circuitry is further configured to resume the reproduction of the content after elapse of a determined period of time.

10. The apparatus of claim 1, wherein the priority information of the event is determined based on an association of the event with a user of the head-mounted display device.

11. The apparatus of claim 1, wherein the priority information of the event is determined by recognition of the event.

12. The apparatus of claim 1, wherein the content includes at least one of an image or a sound.

13. The apparatus of claim 1, wherein the priority information of the event is based on a degree of immersion, of a user of the head-mounted display device, for the content.

14. An apparatus, comprising:
circuitry configured to:
receive priority information of an event that occurs in a determined vicinity of a head-mounted display device;
reproduce content, by the head-mounted display device, based on the priority information of the event that occurs in the determined vicinity of the head-mounted display device;
terminate the reproduction of the content based on the priority information that indicates a first priority level of the event; and
reproduce an image from a real world based on the termination of the reproduction of the content.

15. A method, comprising:
receiving priority information of an event that occurs in a determined vicinity of a head-mounted display device;
reproducing content at the head-mounted display device, based on the priority information of the event that occurs in the determined vicinity of the head-mounted display device;
terminating the reproduction of the content based on the priority information that indicates a first priority level of the event; and
reproducing an image from a real world based on the termination of the reproduction of the content.

16. An apparatus, comprising:
circuitry configured to:
receive priority information of an event that occurs in a determined vicinity of a head-mounted display device;
reproduce content by the head-mounted display device, based on the priority information,
wherein the content is associated with the event;
terminate the reproduction of the content based on the priority information that indicates a first priority level of the event; and
reproduce an image from a real world in the determined vicinity of the head-mounted display device based on the termination of the reproduction of the content.

17. The apparatus of claim 16, wherein the circuitry is further configured to start the reproduction of the image and stop the reproduction of the content, based on the head-mounted display device that is in a moving direction.

* * * * *